United States Patent
Miller et al.

(10) Patent No.: US 10,023,296 B2
(45) Date of Patent: Jul. 17, 2018

(54) INLET DUCT SELECTOR FOR TILTROTOR BARRIER FILTER

(71) Applicant: Bell Helicopter Textron Inc., Fort Worth, TX (US)

(72) Inventors: David L. Miller, North Richland Hills, TX (US); Brent Chadwick Ross, Flower Mound, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 107 days.

(21) Appl. No.: 15/232,465

(22) Filed: Aug. 9, 2016

(65) Prior Publication Data

US 2018/0043986 A1 Feb. 15, 2018

(51) Int. Cl.
*B64C 7/02* (2006.01)
*B64C 27/14* (2006.01)

(52) U.S. Cl.
CPC .............. *B64C 7/02* (2013.01); *B64C 27/14* (2013.01)

(58) Field of Classification Search
CPC ........ B01D 45/12; B01D 46/18; B01D 46/10; G64D 33/02; B64D 33/02; B64D 27/00; B64B 1/24
USPC ...... 55/306; 60/39.092, 39.02; 244/53 B, 68; 137/15, 1, 15.2
See application file for complete search history.

(56) References Cited

U.S. PATENT DOCUMENTS

| | | | |
|---|---|---|---|
| 3,950,157 A | 4/1976 | Matney | |
| 3,998,048 A | 12/1976 | Derue | |
| 4,397,431 A * | 8/1983 | Ben-Porat | B64D 33/02 244/53 B |
| 6,264,137 B1 * | 7/2001 | Sheoran | B64D 33/02 244/53 B |
| 8,721,756 B2 | 5/2014 | Handley et al. | |
| 8,998,130 B2 | 4/2015 | Dailey et al. | |
| 2007/0022723 A1 | 2/2007 | Stelzer | |
| 2009/0261208 A1 * | 10/2009 | Belyew | B01D 46/10 244/53 B |
| 2011/0265650 A1 * | 11/2011 | Kazlauskas | B64D 33/02 95/269 |
| 2014/0077039 A1 | 3/2014 | Scimone | |

OTHER PUBLICATIONS

European Patent Office, European Search Report for EP Appl. No. 17180144.2 dated Jan. 3, 2018, 4 pp.

* cited by examiner

*Primary Examiner* — Duane Smith
*Assistant Examiner* — Minh-Chau Pham
(74) *Attorney, Agent, or Firm* — Daniel J. Chalker; Edwin S. Flores; Chalker Flores, LLP

(57) ABSTRACT

The present invention includes an air flow bypass for a tiltrotor engine comprising: a ram air inlet comprising bypass door(s) capable of at least partially or fully blocking a ram air flow through the ram air inlet; a barrier filter inlet positioned in a side, a bottom, and/or a top of a tiltrotor engine nacelle; a filter plenum; a selector duct comprising one or more openings; and one or more selector duct doors or covers over the one or more openings; wherein the barrier filter inlet, the filter plenum, the one or more openings in the selector duct, the selector duct, and an engine are in fluid communication and the bypass door(s) in the ram inlet are closed and the barrier filter inlet provides filtered air flow to the engine when the aircraft is in hover operations.

20 Claims, 11 Drawing Sheets

INLET DUCT SELECTOR FOR TILTROTOR BARRIER FILTER

CROSS-REFERENCE TO RELATED APPLICATIONS

None.

STATEMENT OF FEDERALLY FUNDED RESEARCH

None.

TECHNICAL FIELD OF THE INVENTION

The present invention relates in general to the field of ram air, and more particularly, to an inlet selector duct for use in rotocraft, for example, tiltrotor aircraft.

BACKGROUND OF THE INVENTION

Without limiting the scope of the invention, its background is described in connection with ram air filters.

One such system is taught in U.S. Pat. No. 8,721,756, issued to Handley, et al., and is entitled "Filter construction for use with air in-take for gas turbine and methods". Briefly, these inventors teach a cartridge filter comprising a structure that can maintain a filter medium in an air stream to filter particulates to protect a gas turbine power system and that the filter combines a mechanically adequate filter structure and an effective filter medium to obtain a useful system.

Another such system is taught in U.S. Pat. No. 8,998,130, issued to Dailey, et al., and is entitled "Self-aligning inlet plenum system for rotorcraft". Briefly, these inventors teach an inlet system for a rotorcraft includes a cowl door assembly and a plenum assembly. The cowl door assembly includes a door member, a cowl inlet opening, and a cowl inlet duct. The plenum assembly is configured to free float in relation to the cowl door. The plenum assembly includes a plenum duct with a plenum band configured to attach the plenum assembly to an inlet opening. An aft seal is located between the aft plenum flange and a firewall, the aft seal being configured to provide a compressive contact between the plenum assembly and the firewall.

Another such system is taught in U.S. Pat. No. 3,950,157, issued to Matney, and is entitled "Ram air filter for light aircraft". Briefly, this inventor is said to teach a ram air filter for light aircraft comprising a parallelepiped housing and a replaceable filter element. The housing comprises a base element and a cover element that are injection molded of high impact plastic and are connected together in a snap-lock manner.

SUMMARY OF THE INVENTION

In one embodiment, the present invention includes an air flow bypass for a tiltrotor engine comprising: a barrier filter inlet positioned in a side, a bottom, and/or a top of a tiltrotor engine nacelle; a filter plenum; a selector duct comprising one or more openings; and one or more selector duct doors or covers for each of the one or more openings; wherein the barrier filter inlet, the filter plenum, the one or more openings in the selector duct, the selector duct, and an engine are in fluid communication; and wherein a bypass air flow from the barrier filter inlet generally provides a filtered air flow to the engine when the aircraft is in hover operations. In one aspect, the nacelle is further defined as comprising: a ram air inlet; one or more bypass doors capable of at least partially or fully blocking a ram air flow through the ram air inlet; and a ram air inlet duct between the ram air inlet and the selector duct; wherein the ram air inlet, the ram air inlet duct, the selector duct, and the engine are in fluid communication; wherein during hover operations the ram air inlet is closed with one or more bypass doors, and the one or more selector duct doors or covers are open to provide only filtered air flow to the engine; and wherein during cruise operations the one or more selector duct doors or covers of the selector duct are generally closed to: completely isolate the filter plenum from the ram air flow through the selector duct, and prevent outflow of the ram air flow through the barrier filter inlet. In another aspect, the air flow bypass further comprises one or more doors or covers at the barrier filter inlet, wherein the one or more doors or covers at the barrier filter inlet are closed during cruise operations to prevent outflow through the barrier filter inlet. In another aspect, the position of the one or more bypass doors, the one or more selector duct doors or covers, or both, are controlled manually or automatically, and/or are heated to prevent icing. In another aspect, the bypass air flow through the barrier filter inlet is regulated by opening the one or more selector duct doors or covers to maximize filtered air flow into the selector duct during hover operations, or closing the one or more selector duct doors or covers to minimize or eliminate drag caused by an outflow through the barrier filter inlet during cruise operations. In another aspect, a relative amount of air flow through the ram air inlet and the barrier filter inlet is optimized by closing the one or more openings in the selector duct and/or opening the one or more bypass doors during a transition from hover operations to cruise operations and vice versa. In another aspect, the filter plenum comprises one or more barrier filters. In another aspect, a size of the filter plenum and the barrier filters is optimized to provide the filtered air flow from the barrier filter inlet into the engine during hover operations. In another aspect, air flow bypass further comprising a computer that calculates an optimal air flow through the ram air inlet versus the barrier filter inlet during hover operations, cruise operations, or a transition between the hover and cruise operations, and displays the information for opening and/or closing the one or more selector duct doors or covers, the one or more bypass doors, or both, in the cockpit. In another aspect, the one or more bypass doors and the one or more selector duct doors or covers are controlled by separate actuators. In another aspect, the one or more selector duct doors or covers are selected from split sliding covers, actuated doors, or rotatable veins.

Yet another embodiment of the present invention includes a method of providing a filtered air to a tiltrotor engine for an aircraft comprising: a barrier filter inlet in a side, a bottom, and/or a top of a tiltrotor engine nacelle, a filter in a filter plenum connected to the barrier filter inlet, a selector duct connected between the tiltrotor engine and the ram air inlet, wherein the selector duct comprises openings in the selector duct and one or more selector duct doors or covers for the one or more openings in a selector duct; and providing the filtered air to the tiltrotor engine by opening the one or more selector duct doors or covers during hover operations such that a barrier air flows into the barrier filter inlet, through the filter and the one or more openings into the selector duct and into the tiltrotor engine. In one aspect, the tiltrotor engine nacelle is defined further as having a ram air inlet in a forward position and in fluid communication with a ram air inlet duct, the selector duct, and the tiltrotor engine, respectively, and one or more bypass doors capable of preventing a ram air flow through the ram air inlet, wherein the one or more bypass doors are closed during hover operations to prevent an unfiltered air from reaching the tiltrotor engine. In another aspect, method further comprises closing the one or more selector duct doors or covers to prevent outflow through the barrier filter during cruise operations when the one or more bypass doors at the ram air inlet are open. In another aspect, the method further comprises positioning at least one of the one or more bypass doors, the one or more selector duct doors or covers, or both manually or automatically, or heating the one or more bypass doors to prevent icing. In another aspect, the method further comprises regulating the barrier air flow through the barrier filter inlet with a barrier filter inlet door or cover to maximize the filtered air flow during hover operations and minimize or stop a ram air flow out of the barrier filter inlet during cruise operations. In another aspect, the method further comprises optimizing a relative amount of air flow through the ram air inlet and the barrier filter inlet during a transition from hover operations to cruise operations and vice versa. In another aspect, the method further comprises optimizing a size of the filter plenum and the barrier filters to provide filtered air flow into the engine during hover operations. In another aspect, the method further comprises calculating an optimal air flow through the ram air inlet versus the barrier filter inlet and displaying the information to a pilot. In another aspect, the method further comprises controlling a position of the one or more bypass doors and the one or more selector duct doors or covers with separate actuators. In another aspect, the one or more selector duct doors or covers are selected from split sliding covers, actuated doors, or rotatable veins.

Yet another embodiment of the present invention includes a filter system for a tiltrotor engine comprising: a tiltrotor engine nacelle having a forward end, an aft end, a bottom, a top, a side, and an engine in the nacelle; a ram air inlet positioned forward of the engine in the tiltrotor engine nacelle; one or more bypass doors positioned to control air flow into the ram air inlet; a ram inlet duct; a selector duct comprising one or more openings; one or more selector duct doors or covers of the one or more openings in the selector duct; a barrier filter inlet positioned between the ram air inlet and the engine on the bottom, side and/or top of the tiltrotor engine nacelle; a filter plenum between the barrier filter inlet and the one or more openings of the selector duct; wherein the selector duct isolates the barrier filter inlet from the ram air inlet when the one or more selector duct doors or covers are closed; wherein the selector duct doors or covers are opened and the one or more bypass doors are closed to provide a filtered air to the engine during hover operations; and wherein the selector duct doors or covers are closed and the one or more bypass doors during cruise operations to prevent a ram air flow out of the barrier filter inlet.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION OF THE INVENTION

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
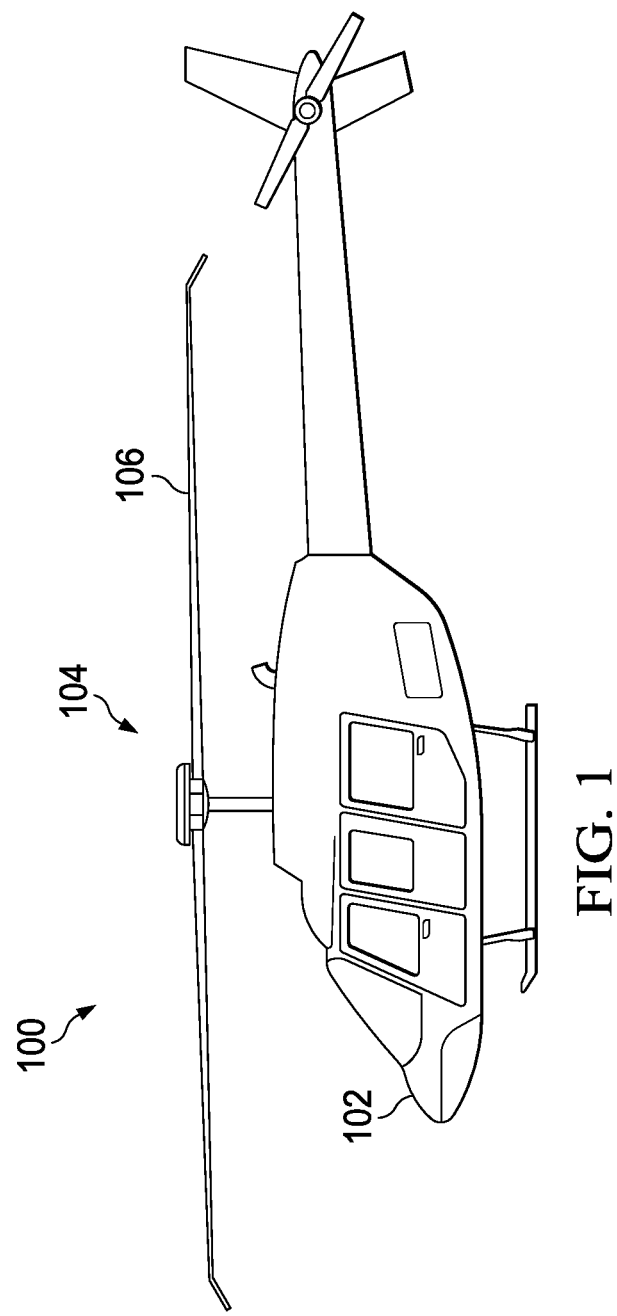
FIG. 1 shows a side view of a helicopter according to a preferred embodiment of the present application.

FIG. 1 depicts an aircraft 100 in accordance with a preferred embodiment of the present application. In the exemplary embodiment, aircraft 100 is a helicopter having a fuselage 102 and a rotor system 104 carried thereon. A plurality of rotor blades 106 is operably associated with rotor system 104 for creating flight. The system of the present invention can be used in conjunction with an aircraft 100. Although shown associated with a helicopter, it will be appreciated that the system of the present application could also be utilized with different types of rotary aircraft and vehicles.

Figure 2A:
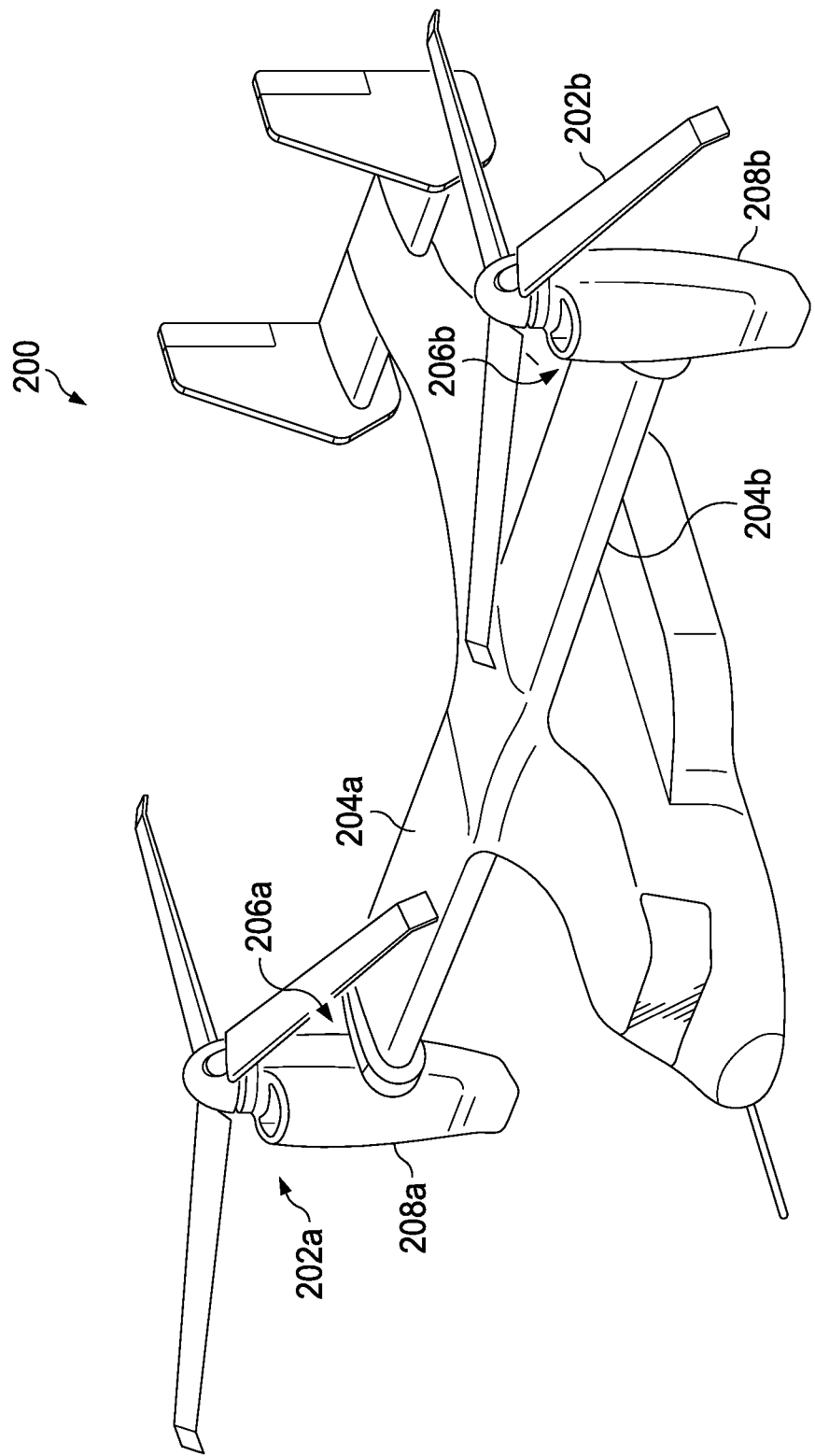
FIGS. 2A and 2B show a perspective view of tiltrotor aircraft according to an alternative embodiment of the present application.

For example, FIG. 2A illustrates a tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which carry the engines and transmissions of tilt rotor aircraft 200. Tilt rotor assemblies 202a and 202b move or rotate relative to wing members 204a and 204b between a helicopter or hover mode in which tilt rotor assemblies 202a and 202b are tilted upward, such that tilt rotor aircraft 200 flies like a conventional helicopter; and an airplane or cruise mode in which tilt rotor assemblies 202a and 202b are tilted forward, such that tilt rotor aircraft 200 flies like a conventional propeller driven aircraft.

Figure 2B:
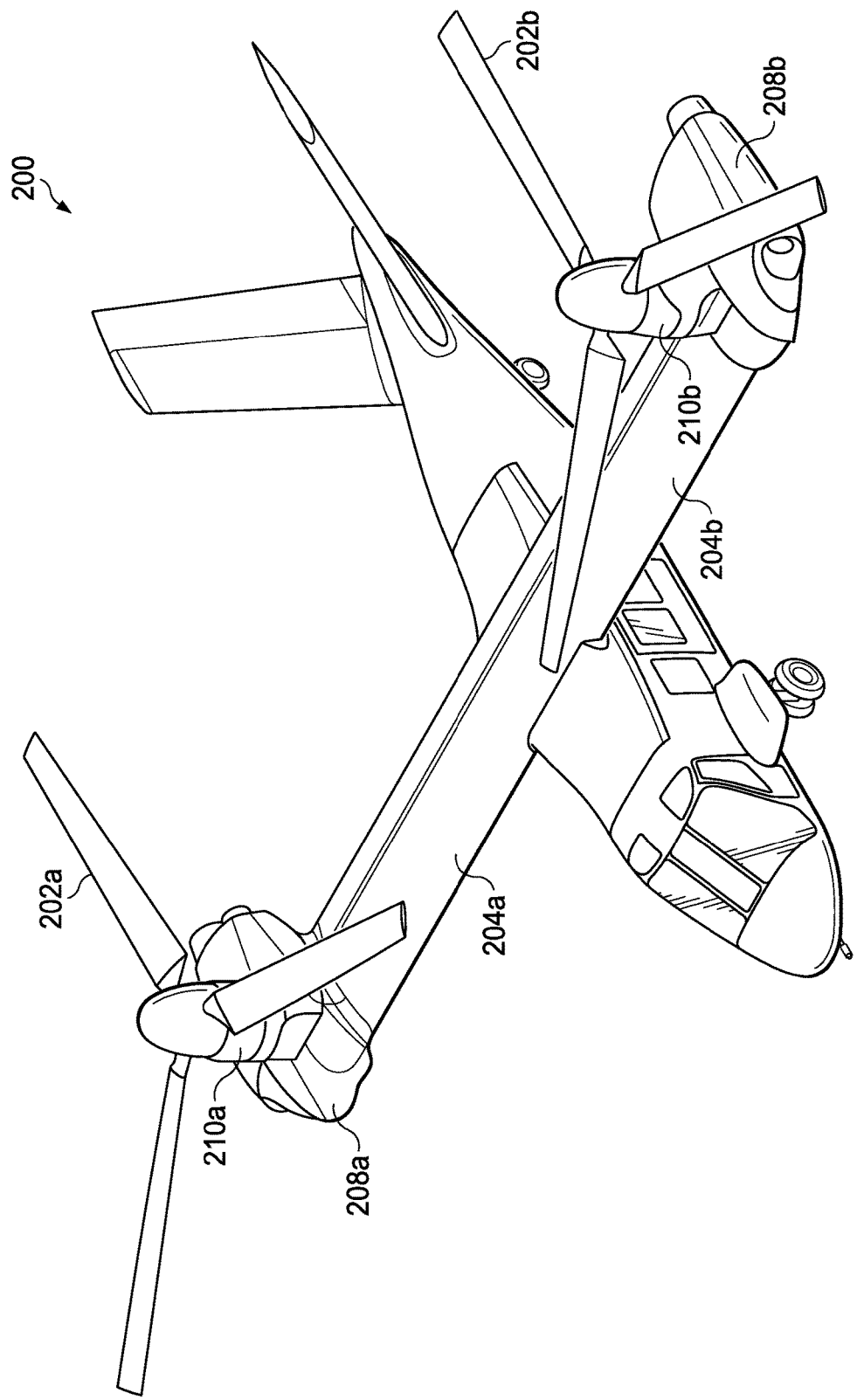

FIG. 2B illustrates another tiltrotor aircraft 200 that utilizes the system in accordance with the present application. Tiltrotor aircraft 200 includes rotor assemblies 202a and 202b that are carried by wings 204a and 204b, and are disposed at end portions 206a and 206b of wings 204a and 204b, respectively. Rotor assemblies 202a and 202b include nacelles 208a and 208b, which include the engines and transmissions of tilt rotor aircraft 200. In this embodiment, the engines are fixed to the wing and do not rotate, rather, only the pylons 210a and 210b with the rotor assemblies 202a and 202b rotates. Tilt rotor assemblies 202a and 202b move and rotate relative to wing members 204a and 204b and the nacelles 208a and 208b. The tilt rotor assemblies 202a and 202b do not more relative to the wing members 204a and 204b. Instead, during the transition between a helicopter or hover mode only the pylons 210a and 210b with the rotor assemblies 202a and 202b rotate to redirect the thrust from the rotor assemblies 202a and 202b. The rotorcraft 200 is still able to fly like a conventional helicopter; and an airplane or cruise mode in which on the rotors are tilted forward, such that tilt rotor aircraft 200 flies like a conventional propeller driven aircraft.

Figure 3A:
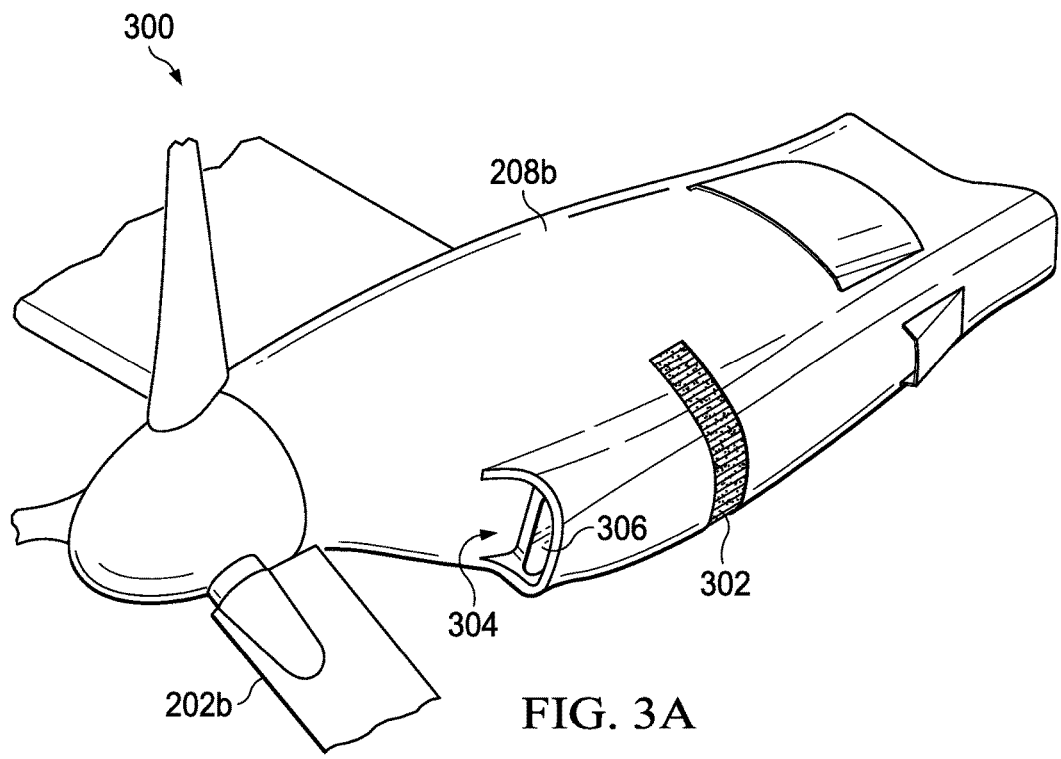
FIG. 3A shows an isometric view of a tilt rotor assembly that depicts the present invention.
Figure 3B:
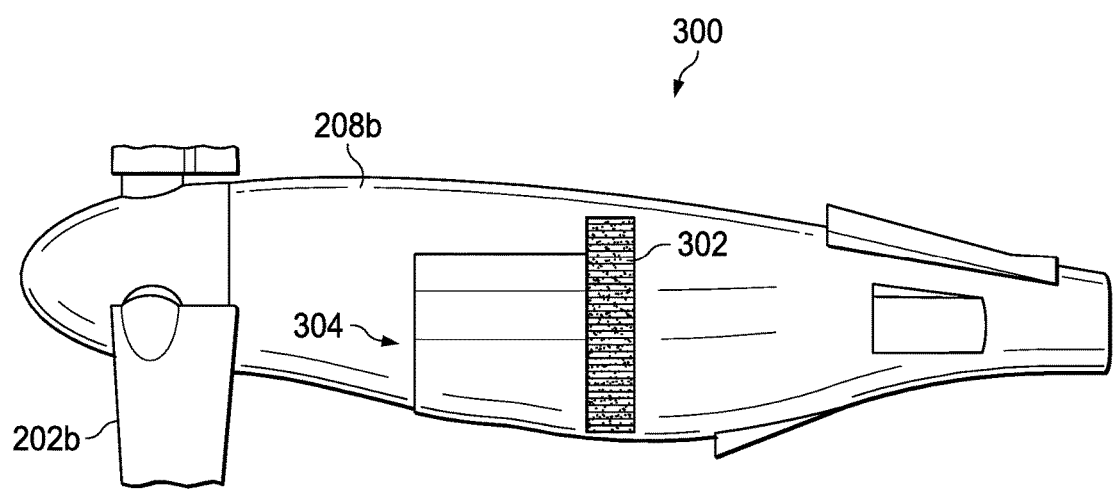
FIG. 3B shows a side view of a tilt rotor assembly that depicts the barrier filter inlet in relation with the ram air inlet along the nacelle.

FIG. 3A shows an isometric view of a tilt rotor assembly 300 that depicts the present invention. Briefly, the tilt rotor assembly 300 is shown in conjunction with a barrier filter inlet 302, which includes the barrier filter, that is positioned between the ram air inlet 304 and the aft portion of the tilt rotor assembly 300, but generally before the engine inlet. The barrier filter is sized, shaped and provided sufficient mechanical support to be used during the entire range of operations for an aircraft engine. For example, the barrier filter will generally be encased in plastic or metal, including a grid, mesh, or other mechanical support, and will generally have a sufficiently large surface area to provide sufficient airflow to operate the engine during any range of operations, including when at least a portion of the barrier filter is clogged from use. The barrier filter will generally be affixed to the engine nacelle or other portion of the engine cowling that will provide sufficient mechanical attachment during engine operations. Materials and fasteners for the barrier filter will be selected that are compatible with aircraft engines. In some configurations that barrier filter inlet 302 could be aft of the engine inlet. A bypass door 306 is depicted in the ram air inlet 304, however, it is possible for the bypass door 306 to be made from more than one door. The tilt rotor assembly 300 is depicted in conjunction with nacelles 208b and rotor assembly 202b. FIG. 3B shows a side view of a tilt rotor assembly 300 that depicts the barrier filter inlet 302 in relation with the ram air inlet 304 along the nacelle 208b.

Figure 4A:
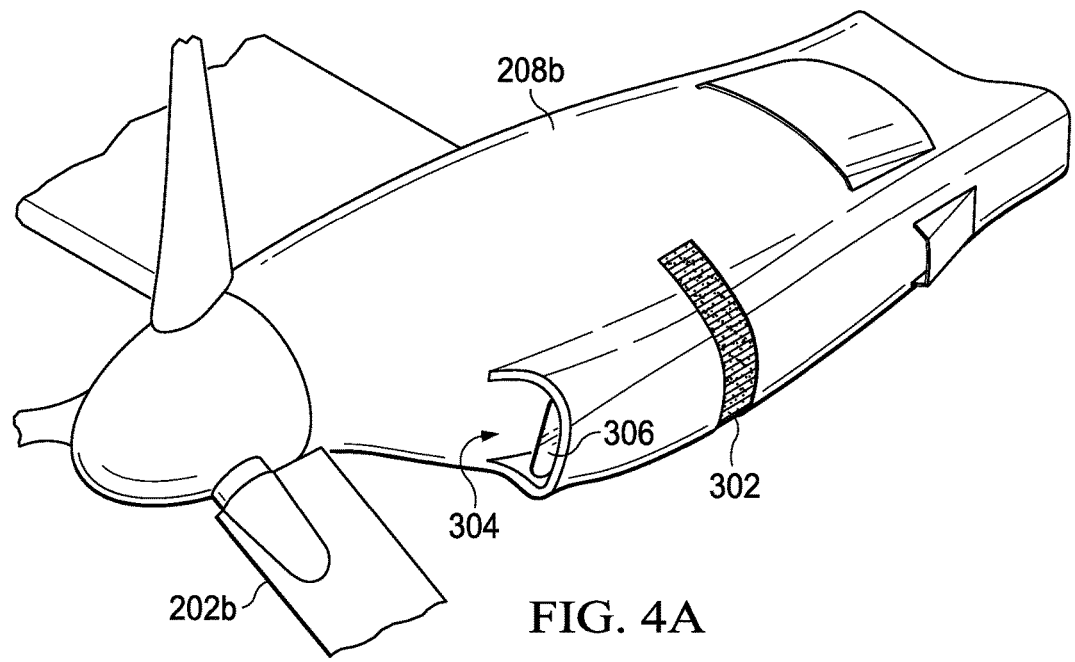
FIG. 4A shows an isometric view of the tilt rotor assembly with the bypass door in the open position.
Figure 4B:
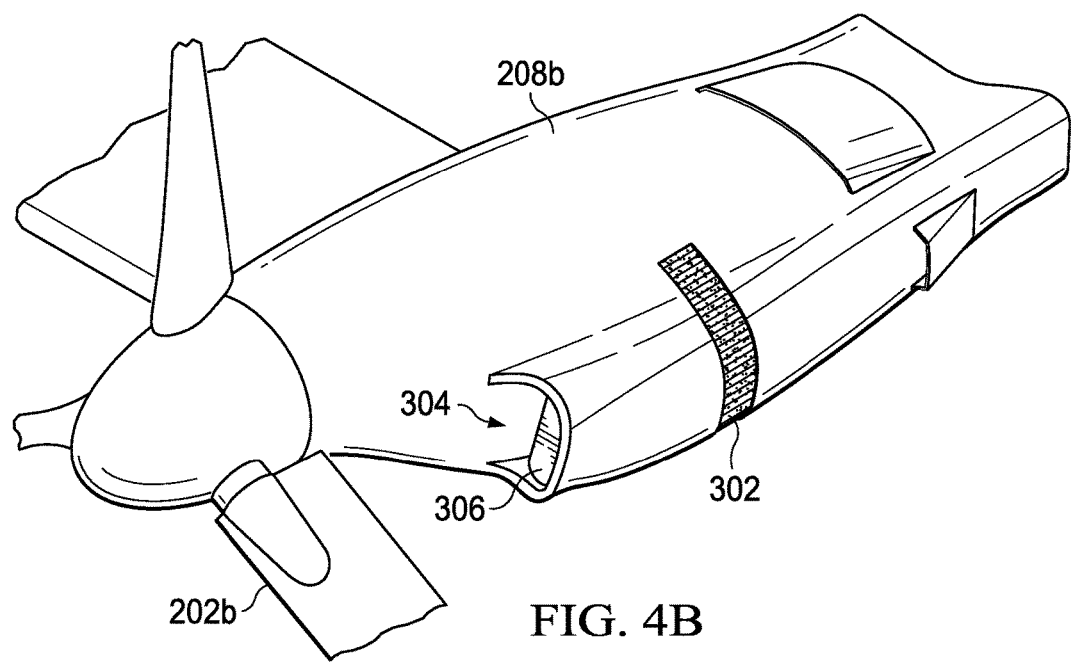
FIG. 4B shows the configuration of the tilt rotor assembly with the bypass door in the closed position.

FIG. 4A shows an isometric view of the tilt rotor assembly 300 with the bypass door 306 at the ram air inlet 304 in the open position, which is the configuration optimized for cruise performance in which ram air enters the engine directly and is used to maximize engine thrust in clean air. FIG. 4B shows the configuration of the tilt rotor assembly 300 with the bypass door 306 in the closed position, wherein the barrier filter inlet 302 provides all the air that enters the engine and that passes through the filter system described hereinbelow.

Figure 5A:
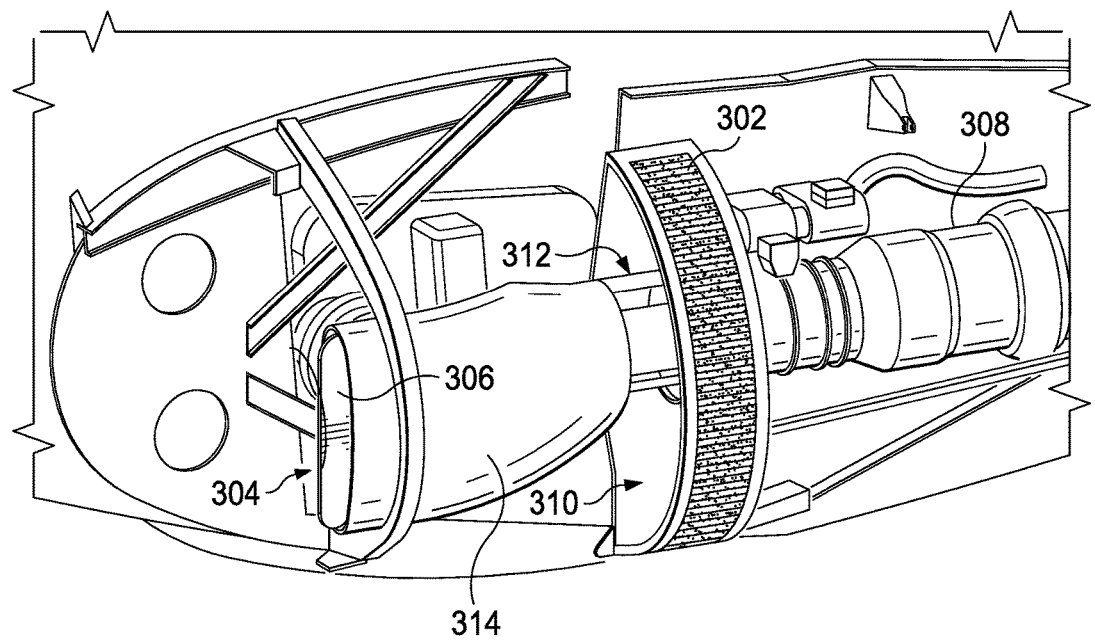
FIG. 5A shows an isometric cut-out view of the tilt rotor assembly with a barrier filter inlet that is positioned between the ram air inlet and the aft portion of the tilt rotor assembly upstream from the engine.

FIG. 5A shows an isometric cut-out view of the tilt rotor assembly 300 with a barrier filter inlet 302 that is positioned between the ram air inlet 304 and the aft portion of the tilt rotor assembly 300 upstream from the engine 308. The barrier filter inlet 302 is in fluid communication with a barrier filter plenum 310, which is down stream from the ram air inlet 304 and the bypass door 306, which are connected by a ram air duct 314 into the selector duct 312. Air that enters the barrier filter inlet 302 crosses a filter within the barrier filter plenum 310 into the selector duct 312, thus providing filtered air to the engine 308. During hover operations and/or under circumstances in which the air surrounding and entering the tilt rotor assembly 300 contains enough sand, dirt, ice, water, or other debris that causes foreign object damage (FOD), dust, water, or other particles, the bypass door 306 is partially or completely closed and the only air entering the engine enters through the barrier filter inlet 302. In cruise mode, that is when the rotorcraft is in flight and the air is clean (and optimum engine performance requires ram air, then the bypass door 306 is open. However, to prevent outflow of ram air through the barrier filter, the selectable duct 312 includes a door or doors that prevent the ram air from bleeding or exiting past the filter in the filter plenum 310 through barrier filter inlet 302.

Figure 5B:
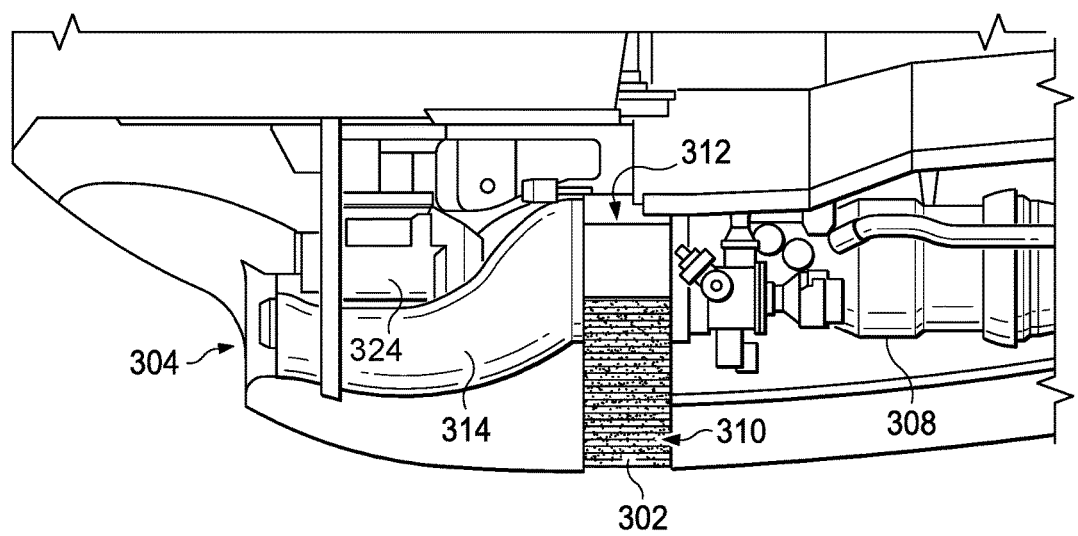
FIG. 5B shows a side cut-out view of the tilt rotor assembly with a barrier filter inlet that is positioned between the ram air inlet and the aft portion of the tilt rotor assembly upstream from the engine.

FIG. 5B shows a side cut-out view of the tilt rotor assembly 300 with a barrier filter inlet 302 that is positioned between the ram air inlet 304 and the aft portion of the tilt rotor assembly 300 upstream from the engine 308. In this view, an opening for an engine output shaft (not depicted) is shown in relation to the ram air inlet 304. Also depicted is a spiral bevel gearbox 324 that provides input to the proprotor gearbox.

Figure 6A:
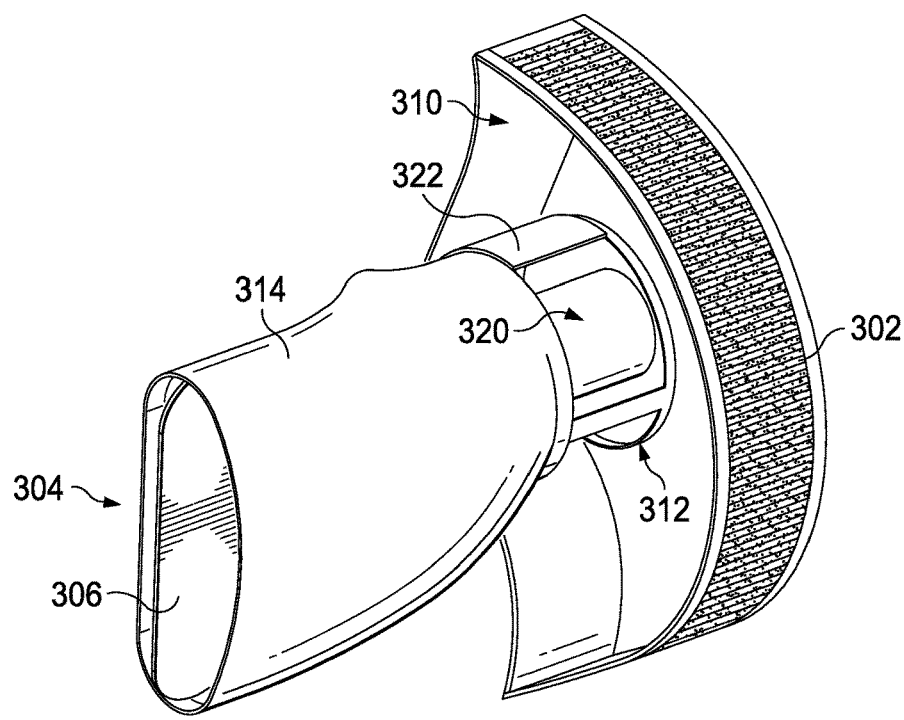
FIGS. 6A to 6C provide more detail of examples of geometry for the various ducts.
Figure 6B:
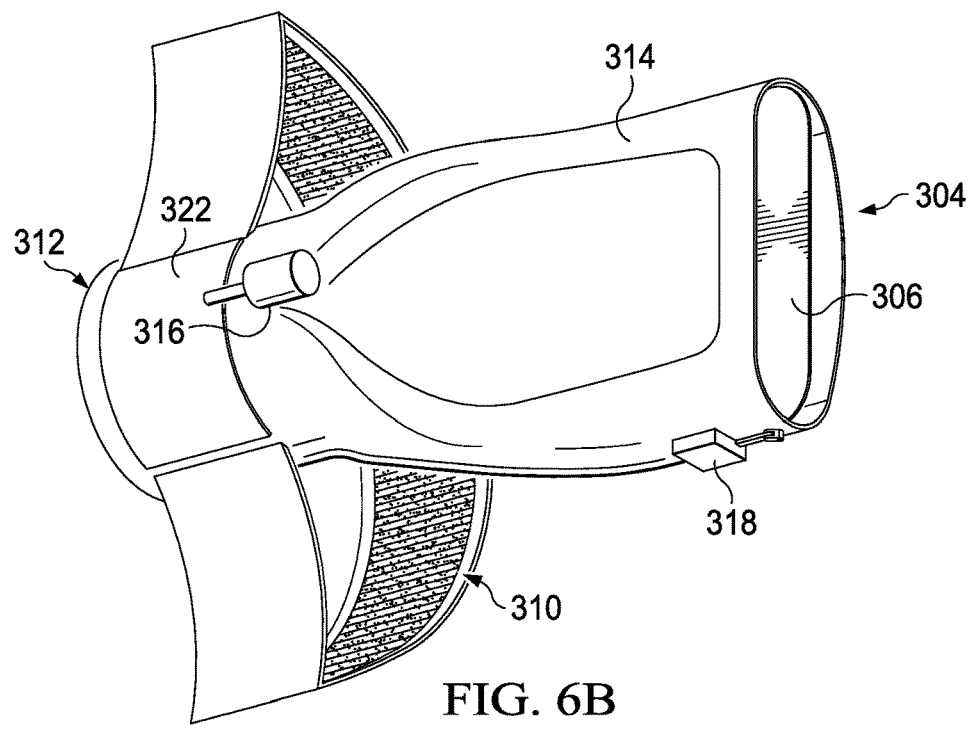
Figure 6C:
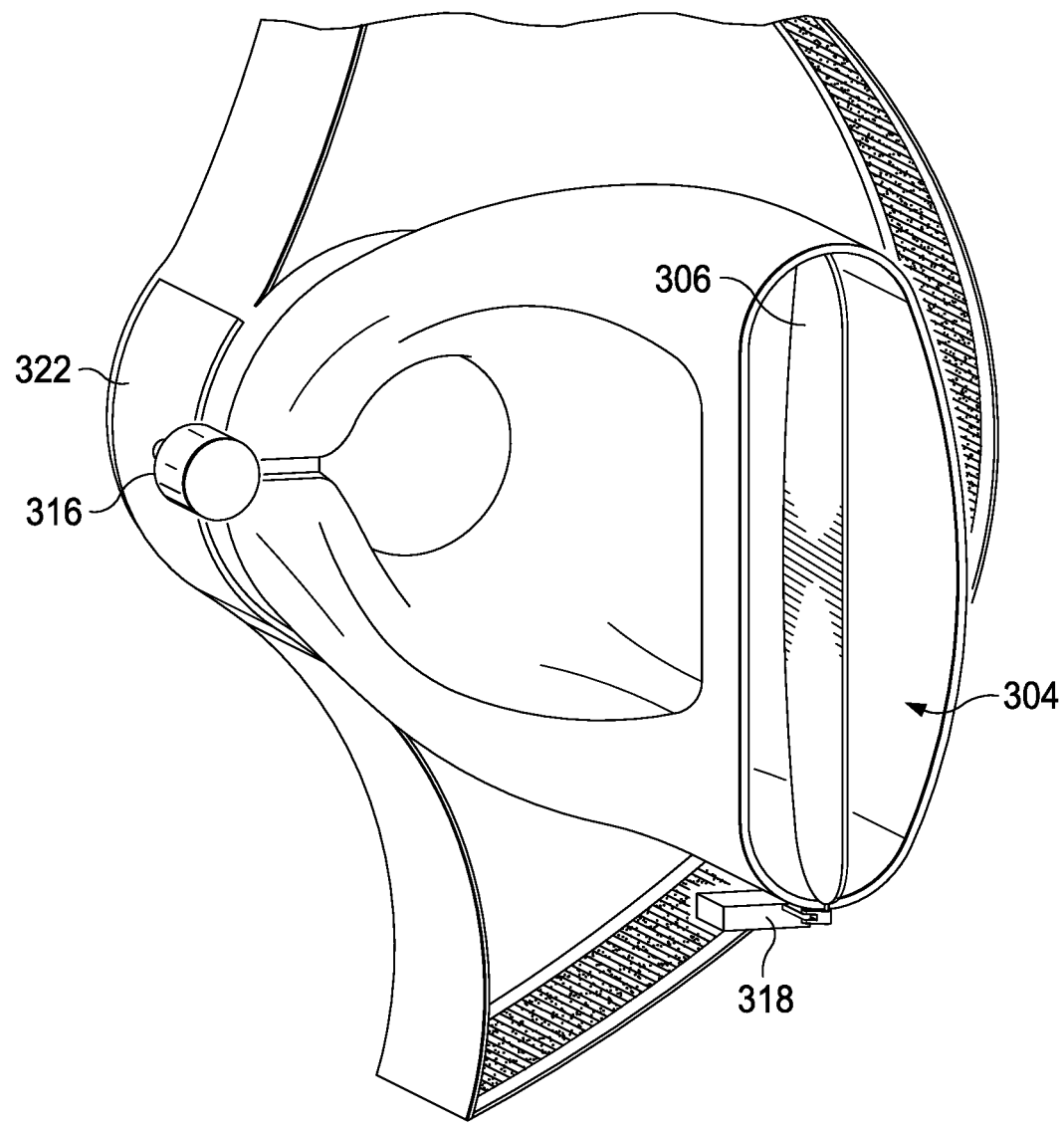

FIGS. 6A to 6C provide more detail of examples of geometry for the various ducts. Specifically, FIG. 6A is an isometric view of the barrier filter plenum 310 and the barrier filter inlet 302, in relation to the ram air inlet 304 and the bypass door 306. The selector duct 312 is depicted with an opening 320 created when the one or more selector duct doors or covers 322 are in an open position. FIG. 6B is an isometric view of the geometry of the various ducts from the side opposite the barrier filter inlet 302, which shows one possible position for a selector duct rotation actuator 316 that would be used to create an opening in the selector duct 312 to the barrier filter plenum 310. In this example, the one or more selector duct doors or covers 322 are in the closed position. Also depicted is a bypass door actuator 318 for the bypass door 306. An engine output shaft (not depicted) that would be surrounded, in this embodiment, by the barrier filter plenum 310 in relation to the barrier filter inlet 302. FIG. 6C shows another isometric view along the longitudinal axis of the ram air inlet 304 in relation to the engine, which depicts the position of the selector duct 312, the selector duct rotation actuator 316, the one or more selector duct doors or covers 322 in the closed position, and the ram inlet bypass door actuator 318, with the bypass door 306 in the open position.

Figure 7A:
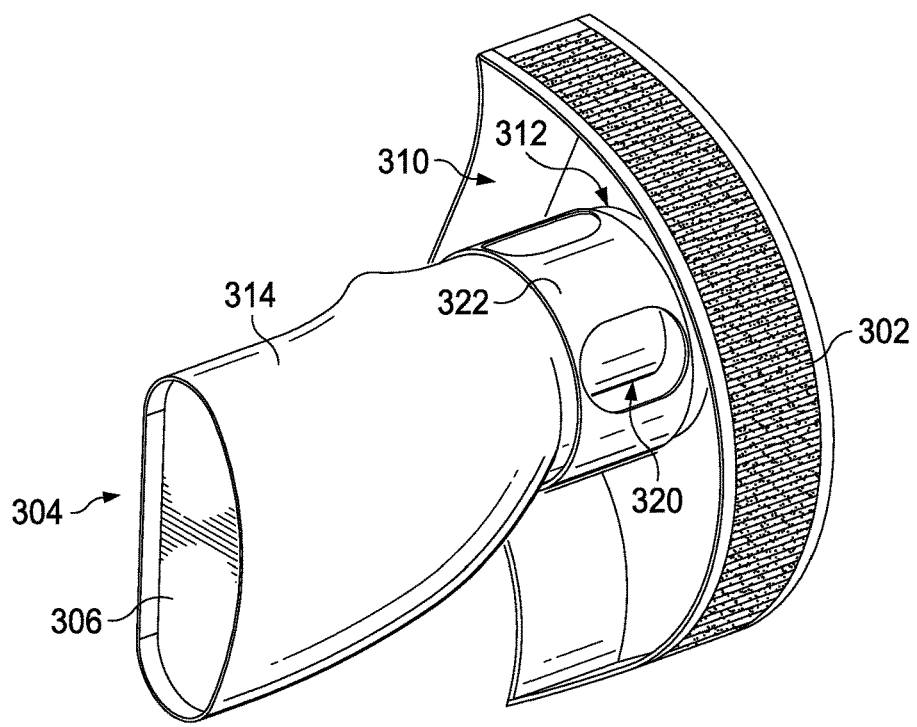
FIG. 7A shows an isometric view of the barrier filter inlet, the barrier filter plenum, the selector duct, the one or more selector duct doors or covers, and the openings depicted in an open position.

FIG. 7A shows an isometric view of the barrier filter inlet 302, the barrier filter plenum 310, the selector duct 312, the one or more selector duct doors or covers 322 in the open position, and the openings 320 depicted in an open position. In this configuration, the bypass door 306 is shown in the closed position, which would be used during hover mode and/or when operating the rotorcraft in dirty air or icing conditions.

Figure 7B:
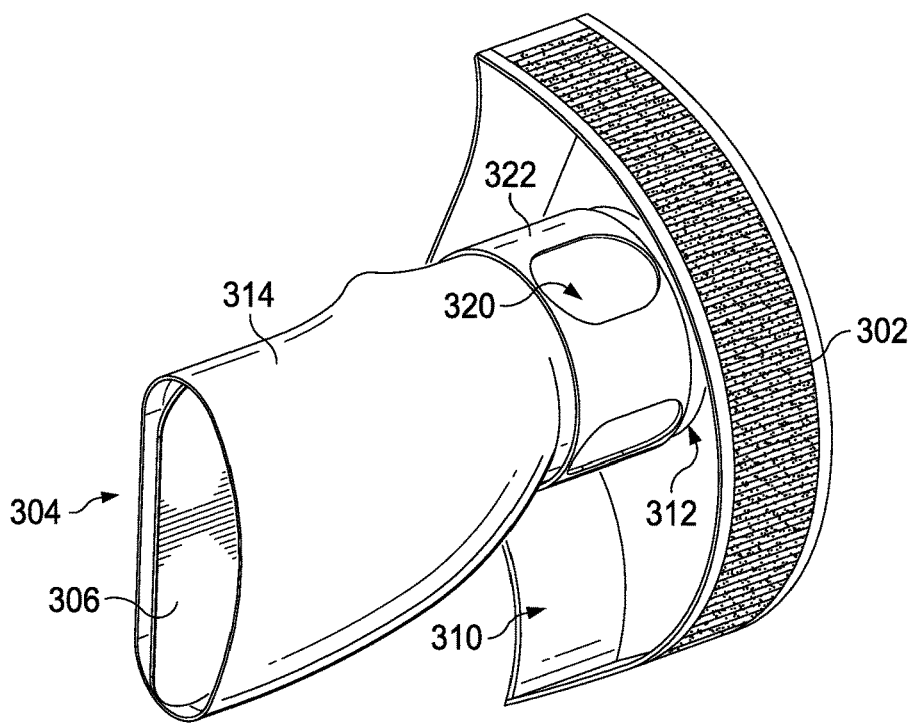
FIG. 7B shows the barrier filter inlet, the barrier filter plenum, the selector duct, the one or more selector duct doors or covers, and the openings depicted in the closed position.

FIG. 7B shows the barrier filter inlet 302, the barrier filter plenum 310, the selector duct 312, the one or more selector duct doors or covers 322 in the closed position, and the openings 320 are closed. In this configuration, the bypass door 306 in the ram air inlet 304 is shown in an open position, which would be used during cruise mode and/or when operating the rotorcraft in clean air and when maximizing input from the ram air inlet 304 into the engine, and without loss of air through the barrier filter inlet because all of the ram air would be forced through the selector duct into the engine without bleeding or outflow of ram air that would reduce engine efficiency and cause turbulence outside the engine.

Figure 8A:
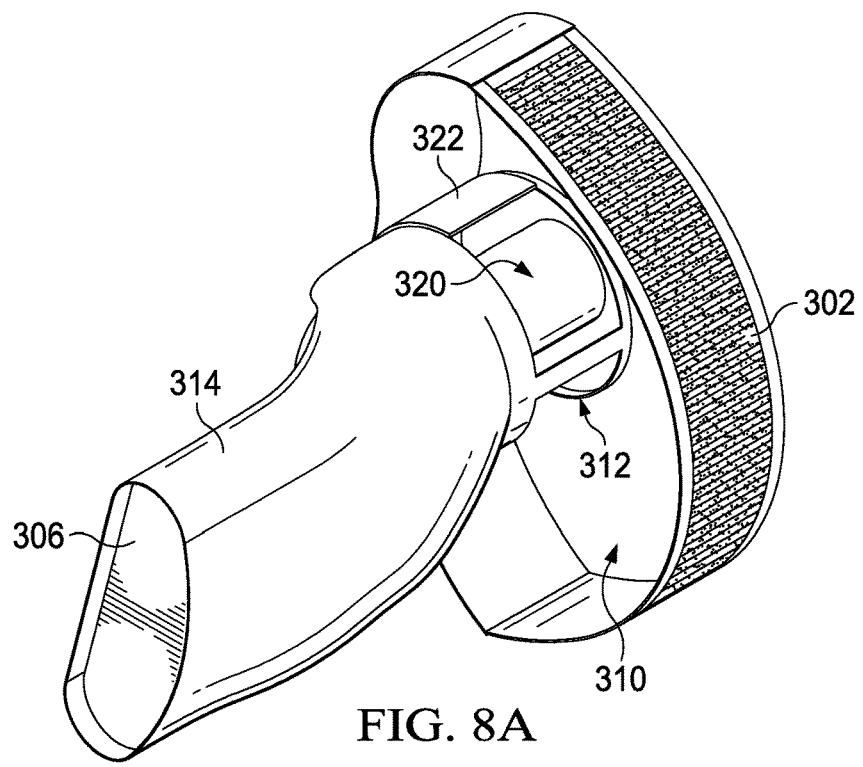
FIG. 8A is an isometric view of the barrier filter inlet, the barrier filter plenum, the selector duct, the one or more selector duct doors or covers, and the openings depicted in an open position depicted as split sliding covers.
Figure 8B:
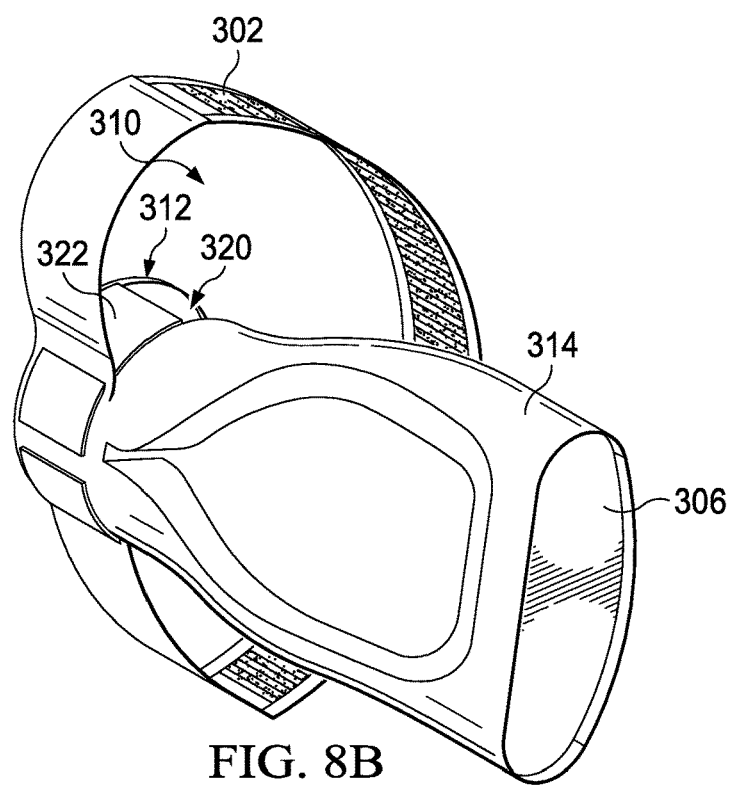
FIG. 8B shows an isometric view from the other side, the one or more selector duct doors or covers, shown as split sliding covers, in the open position.

FIG. 8A is an isometric view of the barrier filter inlet 302, the barrier filter plenum 310, the selector duct 312, the one or more selector duct doors or covers 322 in the open position, and the openings 320 depicted in an open position depicted as split sliding covers 314 depicted such that the openings 320 of the selector duct 312 are open. In FIG. 8B, the one or more selector duct doors or covers 322 in the open position, showing the openings 320 of the selector duct 312, while the bypass door 306 is shown in the closed position.

Figure 9A:
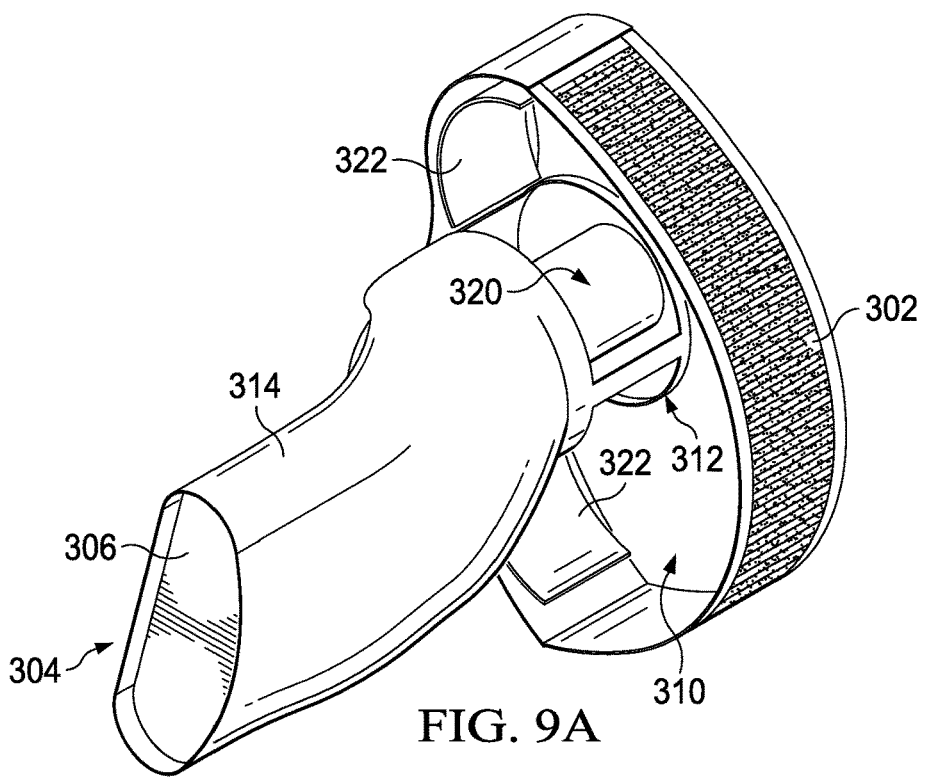
FIG. 9A is an isometric view of the barrier filter inlet, the barrier filter plenum, the selector duct, the one or more selector duct doors or covers, and the openings depicted in an open position. The one or more selector duct doors or covers are depicted as actuated doors such that the openings of the selector duct are open.

FIG. 9A is an isometric view of the barrier filter inlet 302, the barrier filter plenum 310, the selector duct 312, the one or more selector duct doors or covers 322 in the open position and are hinged doors or covers, and the openings 320 depicted in an open position. The one or more selector duct doors or covers 322 are depicted as actuated doors such that the openings 320 of the selector duct 312 are open.

Figure 9B:
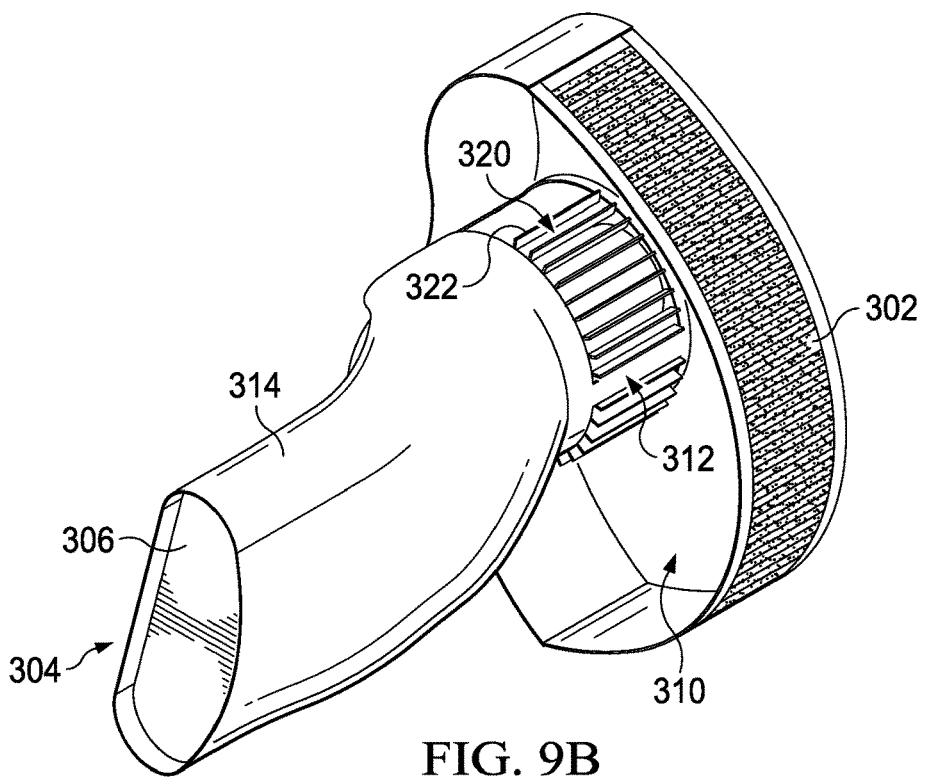
FIG. 9B is an isometric view of the barrier filter inlet, the barrier filter plenum, the selector duct, the one or more selector duct doors or covers, and the openings depicted in an open position. The one or more selector duct doors or covers are depicted as rotatable vanes such that the openings of the selector duct are open.

FIG. 9B is an isometric view of the barrier filter inlet 302, the barrier filter plenum 310, the selector duct 312, the one or more selector duct doors or covers 322 in the open position, and the openings 320 depicted in an open position. The one or more selector duct doors or covers 322 are depicted as rotatable vanes such that the openings 320 of the selector duct 312 are open.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

All of the devices and/or methods disclosed and claimed herein can be made and executed without undue experimentation in light of the present disclosure. While the devices and/or and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

Furthermore, no limitations are intended to the details of construction or design herein shown, other than as described in the claims below. It is therefore evident that the particular embodiments disclosed above may be altered or modified and all such variations are considered within the scope and spirit of the disclosure. Accordingly, the protection sought herein is as set forth in the claims below.

To aid the Patent Office, and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are explicitly used in the particular claim.

What is claimed is:

1. An air flow bypass for a tiltrotor engine comprising:
    a ram air inlet comprising one or more bypass doors capable of at least partially or fully blocking a ram air flow through the ram air inlet;
    a ram air inlet duct;
    a barrier filter inlet positioned in a side, a bottom, and/or a top of a tiltrotor engine nacelle;
    a selector duct comprising one or more openings;
    one or more selector duct doors or covers for each of the one or more openings of the selector duct;
    a filter plenum between the barrier filter inlet and the one or more openings of the selector duct;
    wherein the selector duct isolates the barrier filter inlet from the ram air inlet when the one or more selector duct doors or covers are closed;
    wherein the barrier filter inlet, the filter plenum, the one or more openings in the selector duct, the selector duct, and an engine are in fluid communication;
    wherein the one or more bypass doors in the ram inlet are closed and the one or more selector doors or covers are open such that the barrier filter inlet generally provides a filtered air flow to the engine when the aircraft is in hover operations; and
    wherein the selector doors or covers are closed and the one or more bypass doors are opened during cruise operations to isolate the filter plenum from the ram air flow through the selector duct and prevent outflow of the ram air flow through the barrier filter inlet.

2. The air flow bypass of claim 1, further comprising one or more doors or covers at the barrier filter inlet, wherein the one or more doors or covers at the barrier filter inlet are closed during cruise operations to prevent outflow through the barrier filter inlet.

3. The air flow bypass of claim 1, wherein the position of the one or more bypass doors, the one or more selector duct doors or covers, or both, are at least one of controlled manually or automatically, and/or are heated to prevent icing.

4. The air flow bypass of claim 1, wherein the bypass air flow through the barrier filter inlet is regulated by opening the one or more selector duct doors or covers to maximize filtered air flow into the selector duct during hover operations, or closing the one or more selector duct doors or covers to minimize or eliminate drag caused by an outflow through the barrier filter inlet during cruise operations.

5. The air flow bypass of claim 1, wherein a relative amount of air flow through the ram air inlet and the barrier filter inlet is optimized by closing the one or more openings in the selector duct and/or opening the one or more bypass doors during a transition from hover operations to cruise operations and vice versa.

6. The air flow bypass of claim 1, wherein the filter plenum comprises one or more barrier filters.

7. The air flow bypass of claim 6, wherein a size of the filter plenum and the barrier filters is optimized to provide the filtered air flow from the barrier filter inlet into the engine during hover operations.

8. The air flow bypass of claim 1, further comprising a computer that calculates an optimal air flow through the ram air inlet versus the barrier filter inlet during hover operations, cruise operations, or a transition between the hover and cruise operations, and displays the information for opening and/or closing the one or more selector duct doors or covers, the one or more bypass doors, or both, in the cockpit.

9. The air flow bypass of claim 1, wherein the one or more bypass doors in the ram air inlet and the one or more selector duct doors or covers are controlled by separate actuators.

10. The air flow bypass of claim 1, wherein the one or more selector duct doors or covers are selected from split sliding covers, actuated doors, or rotatable veins.

11. A method of providing a filtered air to a tiltrotor engine for an aircraft comprising:
    providing a ram air inlet comprising one or more bypass doors capable of at least partially or fully blocking a ram air flow through the ram air inlet, a ram air inlet duct, a barrier filter inlet in a side, a bottom, and/or a top of a tiltrotor engine nacelle, a selector duct connected between the tiltrotor engine and the ram air inlet, wherein the selector duct comprises one or more openings in the selector duct and one or more selector duct doors or covers for each of the one or more openings in the selector duct, a filter plenum between the barrier filter inlet and the one or more openings of the selector duct, and wherein the selector duct isolates the barrier filter inlet from the ram air inlet when the one or more selector duct doors or covers are closed;
    providing a filtered air to the tiltrotor engine by closing the one or more bypass doors and opening the one or more selector doors or covers during hover operations such that a barrier air flows into the barrier filter inlet into the barrier filter plenum, through the one or more openings into the selector duct and into the tiltrotor engine; and
    closing the one or more selector duct doors or covers to isolate the filter plenum from the ram air flow through the selector duct and prevent outflow of the ram air flow through the barrier filter inlet during cruise operations when the one or more bypass doors at the ram air inlet are open.

12. The method of claim 11, wherein the tiltrotor engine nacelle is defined further as having a ram air inlet in a forward position and in fluid communication with a ram air inlet duct, the selector duct, and the tiltrotor engine, respectively, and one or more bypass doors capable of preventing a ram air flow through the ram air inlet, wherein the one or more bypass doors are closed during hover operations to prevent an unfiltered air from reaching the tiltrotor engine.

13. The method of claim 12, further comprising at least one of positioning the one or more bypass doors, the one or more selector duct doors or covers, or both manually or automatically, or heating the one or more bypass doors to prevent icing.

14. The method of claim 11, further comprising regulating the barrier air flow through the barrier filter inlet with a barrier filter inlet door or cover to maximize the filtered air flow during hover operations and minimize or stop a ram air flow out of the barrier filter inlet during cruise operations.

15. The method of claim 11, further comprising optimizing a relative amount of air flow through the ram air inlet and the barrier filter inlet during a transition from hover operations to cruise operations and vice versa.

16. The method of claim 11, further comprising optimizing a size of the filter plenum and the barrier filters to provide filtered air flow into the engine during hover operations.

17. The method of claim 11, further comprising calculating an optimal air flow through the ram air inlet versus the barrier filter inlet and displaying the information to a pilot.

18. The method of claim 12, further comprising controlling a position of the one or more bypass doors and the one or more selector duct doors or covers with separate actuators.

19. The method of claim 11, wherein the one or more selector duct doors or covers are selected from split sliding covers, actuated doors, or rotatable veins.

20. A filter system for a tiltrotor engine comprising:
a tiltrotor engine nacelle having a forward end, an aft end, a bottom, a top, a side, and an engine in the nacelle;
a ram air inlet positioned forward of the engine in the tiltrotor engine nacelle;
one or more bypass doors positioned to control an air flow into the ram air inlet;
a ram inlet duct;
a selector duct comprising one or more openings;
one or more selector duct doors or covers for each of the one or more openings in the selector duct;
a barrier filter inlet positioned on the bottom, side(s) and/or top of the tiltrotor engine nacelle;
a filter plenum between the barrier filter inlet and the one or more openings of the selector duct;
wherein the selector duct isolates the barrier filter inlet from the ram air inlet when the one or more selector duct doors or covers are closed;
wherein the one or more selector duct doors or covers are opened and the one or more bypass doors are closed to provide only filtered air to the engine during hover operations; and
wherein the one or more selector duct doors or covers are closed and the one or more bypass doors are open during cruise operations to isolate the filter plenum from the ram air flow through the selector duct and prevent outflow of the air flow through the barrier filter inlet.

* * * * *